(12) United States Patent
Moore et al.

(10) Patent No.: US 9,489,195 B2
(45) Date of Patent: Nov. 8, 2016

(54) METHOD AND APPARATUS FOR CONFIGURING CONTROL SOFTWARE FOR RADAR SYSTEMS HAVING DIFFERENT HARDWARE ARCHITECTURES AND RELATED SOFTWARE PRODUCTS

(71) Applicants: Alan B. Moore, Fullerton, CA (US); Erin L. Kashiwada, Yorba Linda, CA (US)

(72) Inventors: Alan B. Moore, Fullerton, CA (US); Erin L. Kashiwada, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 219 days.

(21) Appl. No.: 14/103,157

(22) Filed: Dec. 11, 2013

(65) Prior Publication Data

US 2015/0026662 A1 Jan. 22, 2015

Related U.S. Application Data

(60) Provisional application No. 61/846,839, filed on Jul. 16, 2013.

(51) Int. Cl.
*G01S 13/00* (2006.01)
*G01S 13/93* (2006.01)
*G06F 19/00* (2011.01)
*G06F 9/44* (2006.01)
*G06F 9/445* (2006.01)

(52) U.S. Cl.
CPC . *G06F 8/71* (2013.01); *G06F 8/64* (2013.01); *G06F 9/44505* (2013.01)

(58) Field of Classification Search
CPC ...... G06F 8/71; G01S 13/931; G01S 13/953; G01S 13/86; G01S 13/88
See application file for complete search history.

(56) References Cited

U.S. PATENT DOCUMENTS 5,317,319 A 5/1994 Fagarasan et al.
5,675,748 A * 10/1997 Ross ............................ 710/104
5,751,609 A 5/1998 Schaefer, Jr. et al.
(Continued)

FOREIGN PATENT DOCUMENTS

AU 646 167 B2 2/1994
EP 1772747 4/2007
(Continued)

OTHER PUBLICATIONS

Robert O'Donnell, "Radar System Enginneering", IEEE, 2010, <http://ece.wpi.edu/radarcourse/Radar%202010%20PDFs/Radar%202009%20A_9%20Antennas%202.pdf>, pp. 1-70.*
Aloi et al., Software defined radar: synchronization issues and practical implementation, Oct. 2011, 5 pages.*
Salamone; "Electronic Software Distribution: Diamond in the Rough;" 8178 Data Communications International; No. 4; Mar. 22, 1993; 5 pages.
(Continued)

*Primary Examiner* — Thuy Dao
(74) *Attorney, Agent, or Firm* — Daly, Crowley, Mofford & Durkee, LLP

(57) ABSTRACT

Techniques and systems are provided for generating radar control software for radar systems having a variety of different hardware architectures in an efficient manner. A base radar control program may be provided that is configurable using architecture-specific configuration data. A database may also be provided that includes configuration data associated with a plurality of different radar system architectures. Radar control software may be generated for a radar system of interest by retrieving configuration data associated with a corresponding hardware architecture from the database and using the data to configure the base radar control program.

18 Claims, 4 Drawing Sheets

(56) References Cited

U.S. PATENT DOCUMENTS

| | | | |
|---|---|---|---|
| 6,704,864 B1* | 3/2004 | Philyaw | 713/1 |
| 6,744,379 B1* | 6/2004 | Aker | G01S 7/04 340/936 |
| 7,307,583 B1* | 12/2007 | Woodell | G01S 7/4026 342/173 |
| 7,536,394 B1 | 5/2009 | Gryparis | |
| 7,551,988 B1 | 6/2009 | Wichgers et al. | |
| 7,808,422 B1* | 10/2010 | Woodell | G01S 7/2813 342/159 |
| 8,098,192 B1* | 1/2012 | Wichgers | G01S 13/94 342/26 B |
| 8,384,585 B2 | 2/2013 | Nohara et al. | |
| 8,604,963 B1* | 12/2013 | Kronfeld | G01S 7/003 342/26 B |
| 9,070,236 B1 | 6/2015 | DiEsposti | |
| 9,103,628 B1 | 8/2015 | Moraites et al. | |
| 9,116,227 B2* | 8/2015 | Lee | G01S 3/74 |
| 9,291,707 B2* | 3/2016 | Nohara | G01S 13/426 |
| 9,354,633 B1* | 5/2016 | McCusker | G01S 13/953 |
| 2003/0120624 A1* | 6/2003 | Poppenga et al. | 707/1 |
| 2003/0213358 A1 | 11/2003 | Harding | |
| 2004/0068415 A1 | 4/2004 | Solomon | |
| 2004/0073360 A1* | 4/2004 | Foxlin | 701/207 |
| 2005/0060527 A1* | 3/2005 | Philyaw | 713/1 |
| 2005/0264438 A1* | 12/2005 | Fullerton | G01S 13/0209 342/28 |
| 2006/0112119 A1 | 5/2006 | Vian et al. | |
| 2008/0077616 A1 | 3/2008 | Davidson et al. | |
| 2008/0150787 A1 | 6/2008 | Cummings et al. | |
| 2008/0211708 A1* | 9/2008 | Haberland et al. | 342/27 |
| 2008/0297396 A1 | 12/2008 | Dark et al. | |
| 2009/0085797 A1* | 4/2009 | Wise et al. | 342/189 |
| 2009/0100995 A1 | 4/2009 | Fisher | |
| 2009/0102703 A1* | 4/2009 | Mohamadi et al. | 342/204 |
| 2009/0224956 A1 | 9/2009 | Dark et al. | |
| 2010/0042988 A1 | 2/2010 | Lundin et al. | |
| 2010/0191698 A1* | 7/2010 | Tyler | 706/54 |
| 2011/0202278 A1 | 8/2011 | Caute et al. | |
| 2012/0139786 A1 | 6/2012 | Puzella et al. | |
| 2013/0053653 A1* | 2/2013 | Cuddihy et al. | 600/301 |
| 2013/0293406 A1 | 11/2013 | Herman et al. | |
| 2014/0097979 A1 | 4/2014 | Nohara et al. | |
| 2015/0025927 A1 | 1/2015 | Hershey et al. | |
| 2015/0026662 A1 | 1/2015 | Moore et al. | |
| 2016/0223642 A1 | 8/2016 | Moore et al. | |

FOREIGN PATENT DOCUMENTS

| | | |
|---|---|---|
| EP | 2610636 | 7/2013 |
| KR | 20120126512 | 11/2012 |
| WO | WO 2006/110973 A1 | 10/2006 |
| WO | WO 2015/009526 A1 | 1/2015 |
| WO | WO 2015/050610 A1 | 4/2015 |

OTHER PUBLICATIONS

PCT Search Report of the ISA for PCT/US2014/046105 dated Oct. 16, 2014.

PCT Written Opinion of the ISA for PCT/US2014/046105 dated Oct. 16, 2014.

Whisnant, et al.; "A system model for dynamically reconfigurable software;" IBM Systems Journal; vol. 42, No. 1; Jan. 2003.

Moore, et al.; "Method, System and Software for Supporting Multiple Radar Mission Types;" Patent Application filed on Dec. 11, 2013; U.S. Appl. No. 14/103,147.

Notification of Transmittal of the International Search Report and the Written Opinion of the International Search Authority, or the Declaration, PCT/US2014/045678, date of mailing Apr. 9, 2015, 5 pages.

Written Opinion of the International Searching Authority, PCT/US2014/045678, date of mailing Apr. 9, 2015, 9 pages.

Lambert: "F-104G Starfighter European Production of Systems", Flight International, vol. 83, No. 2818, Mar. 14, 1963, pp. 368-377, XP055178924, sec. Nasarr, figs. on pp. 371-372.

Antonik P. et al.: "Integrated end-to-end radar processing using knowledge-based control", Record of the 1999 IEEE Radar Conference. Waltham, MA Apr. 20-22, 1999; [IEEE Radar Conference], New York NY: IEEE, US, Apr. 20, 1999, pp. 256-261, XP000895757, ISBN: 978-0-7803-4978-0, sec. Introduction, Knowledge-Based Control; figures 3,4.

Whisnant, et al.; "A system model for dynamically reconfigurable software;" IBM Systems Journal; vol. 42; No. 1; Jan. 2003, 15 pages.

Smith C A ED—Institute of Electrical and Electronics Engineers: "The B-2 radar", Improving Systems Effectiveness in the Changing Environment of the 90's. Anaheim, Sep. 24-26, 1991; [Proceedings of the Systems Readiness Technology Conference. (AUTOTESTCON)], New York, IEEE, US, vol. -, Sep. 24, 1991, pp. 17-33, XP010036867, DOI: 10.1109/AUTEST.1991.197526. ISBN: 978-0-87942-576-0, p. 17-p. 20; figures 1-3.

Emery et al.: "The operation and performance of a multi-frequency HF Surfacewave Radar", Radar Conference, 2005. Radar '08. IEEE, IEEE, PISCATAWAY, NJ, USA, May 26, 2008, pp. 1-6, XP031376212, ISBN: 978-1-4244-1538-0, sec. 3.2.

Notification Concerning Transmittal of International Preliminary Report on Patentability (Chapter I of the Patent Cooperation Treaty) and Written Opinion of the International Searching Authority, PCT/US2014/046105, date of mailing Jan. 28, 2016, 8 pages.

European Patent Application No. 14755935.5 Response to Office Action filed on Aug. 19, 2016, 18 pages.

Non-Final Office Action dated Aug. 26, 2016; for U.S. Appl. No. 14/103,147; 21 pages.

Australian Application No. 2014329980 Patent Examination Report No. 1 dated Jul. 7, 2016, 3 pages.

* cited by examiner

METHOD AND APPARATUS FOR CONFIGURING CONTROL SOFTWARE FOR RADAR SYSTEMS HAVING DIFFERENT HARDWARE ARCHITECTURES AND RELATED SOFTWARE PRODUCTS

CROSS REFERENCE TO RELATED APPLICATION

The present application claims the benefit of U.S. Provisional Patent Application No. 61/846,839 filed on Jul. 16, 2013, which is hereby incorporated by reference herein in its entirety.

BACKGROUND

As is well known, a radar system is a system that derives information about a remote target by directing radio frequency (RF) goals (e.g., RF pulses, etc.) toward the target and analyzing the return energy that results from reflection of the transmitted signals from the target. As with most electronic systems, performance, function, cost and ease of implementation are often issues with radar systems. Techniques are needed for implementing radar systems in a cost effective and efficient manner that are capable of optimizing the performance and functional capabilities of the radar hardware and are adaptable and re-usable in a variety of hardware configurations.

SUMMARY

In accordance with one aspect of the concepts, systems, circuits, and techniques described herein, a method is provided for generating or configuring radar control software for a radar system, which comprises: determining a hardware architecture associated with a radar system of interest; retrieving configuration data from a configuration database that is associated with the hardware architecture; and using the retrieved configuration data to configure a base radar control software program to configure or operate a radar control program for the radar system of interest.

In one embodiment, using the retrieved configuration data to configure a base radar control software program to work with the radar system of interest includes using the configuration data to adapt one or more common radar functions in the radar control software to the identified radar architecture.

In one embodiment, the method further comprises determining, retrieving, and using hardware architecture and implementation to configure radar control software for radars having a variety of different hardware architectures. The software may be configured either in advance of the functional operation or dynamically during the functional operation of the software for the intended radar mission.

In one embodiment, determining a hardware architecture associated with a radar system of interest includes receiving a hardware architecture indication as input from an operator.

In one embodiment, the method further comprises delivering the configured radar control software program to an end user associated with the radar system of interest.

In one embodiment, the method further comprises storing the configured radar control software program on a non-transitory computer readable medium or media.

In one embodiment, the method further comprises transmitting the configured radar control software program to an end user associated with the radar system of interest via a network.

In accordance with another aspect of the concepts, systems, circuits, and techniques described herein, a system for generating or configuring radar control software for radar systems having a variety of different hardware architectures comprises a database storing configuration data for use in configuring a configurable base radar control software program, the database having different configuration files that are associated with different radar system architectures; and one or more digital processors configured to: determine a hardware architecture associated with a radar system of interest; retrieve configuration data from a configuration database that is associated with the identified hardware architecture; and configure the configurable base radar control software program to work with the radar system of interest using the retrieved configuration data.

In one embodiment, the system further comprises a digital media writer coupled to the one or more digital processors to write the configured radar control software program to a non-transitory computer readable storage medium or media.

In one embodiment, the database includes one or more configuration files for each radar system architecture supported.

In one embodiment, the database includes one or more configuration files for the plurality of all types of radar system architecture supported.

In one embodiment, the base radar control software program includes a plurality of modules or functions for controlling operation of a radar system, the plurality of modules or functions including a module or function for at least one of the following: antenna control, antenna rotation, beam steering, signal processing, timing and scheduling, external data communications, user control and display, coordinate transformation and stabilization, and target tracking.

In one embodiment, at least one of the modules or functions associated with the base radar control software program is configurable using configuration data from the database.

In one embodiment, the database includes first configuration data associated with a first radar architecture that includes a rotatable antenna and second configuration data associated with a second radar architecture that includes a stationary antenna.

In one embodiment, the database includes first configuration data associated with a first radar architecture that includes an antenna array and second configuration data associated with a second radar architecture that includes a parabolic dish antenna.

In one embodiment, the database includes first configuration data associated with a first radar architecture that includes an electronically steerable array and second configuration data associated with a second radar architecture that includes a mechanically steerable antenna.

In one embodiment, the database includes first configuration data associated with a first radar architecture that includes a full-array antenna beamforming/feed architecture and second configuration data associated with a second radar architecture that includes a sub-array antenna beamforming/feed architecture.

In one embodiment, the database includes first configuration data associated with a first radar architecture that includes a radio frequency (RF) transmitter operative within a first frequency band and second configuration data associated with a second radar architecture that includes an RF transmitter that is operative within a second frequency band that is different from and non-overlapping with the first frequency band.

In one embodiment, the database includes first configuration data associated with a first radar architecture situated on a stationary platform and second configuration data associated with a second radar architecture situated on a mobile platform.

In one embodiment, the system further comprises a network interface device coupled to the one or more digital processors to transmit the configured radar control software program to an end user associated with the radar system of interest via a network.

In accordance with still another aspect of the concepts, systems, circuits, and techniques described herein, an apparatus is provided that comprises a non-transitory computer readable medium or media having the following stored thereon: a configurable radar control software program to control operation of an associated radar system when executed by a computer of the radar system, the configurable radar control software program having a plurality of modules or functions for performing basic radar tasks, wherein one or more of the plurality of modules or functions are configurable using configuration data; and computer instructions that, when executed by a processing system, operate to: determine a radar system architecture associated with a radar system of interest, retrieve configuration data from a database based on the identified radar system architecture, and adapt at least one of the plurality of modules or functions of the configurable radar control software program using the retrieved configuration data.

BRIEF DESCRIPTION OF THE DRAWINGS

The foregoing features may be more fully understood from the following description of the drawings in which.

DETAILED DESCRIPTION

Figure 1:
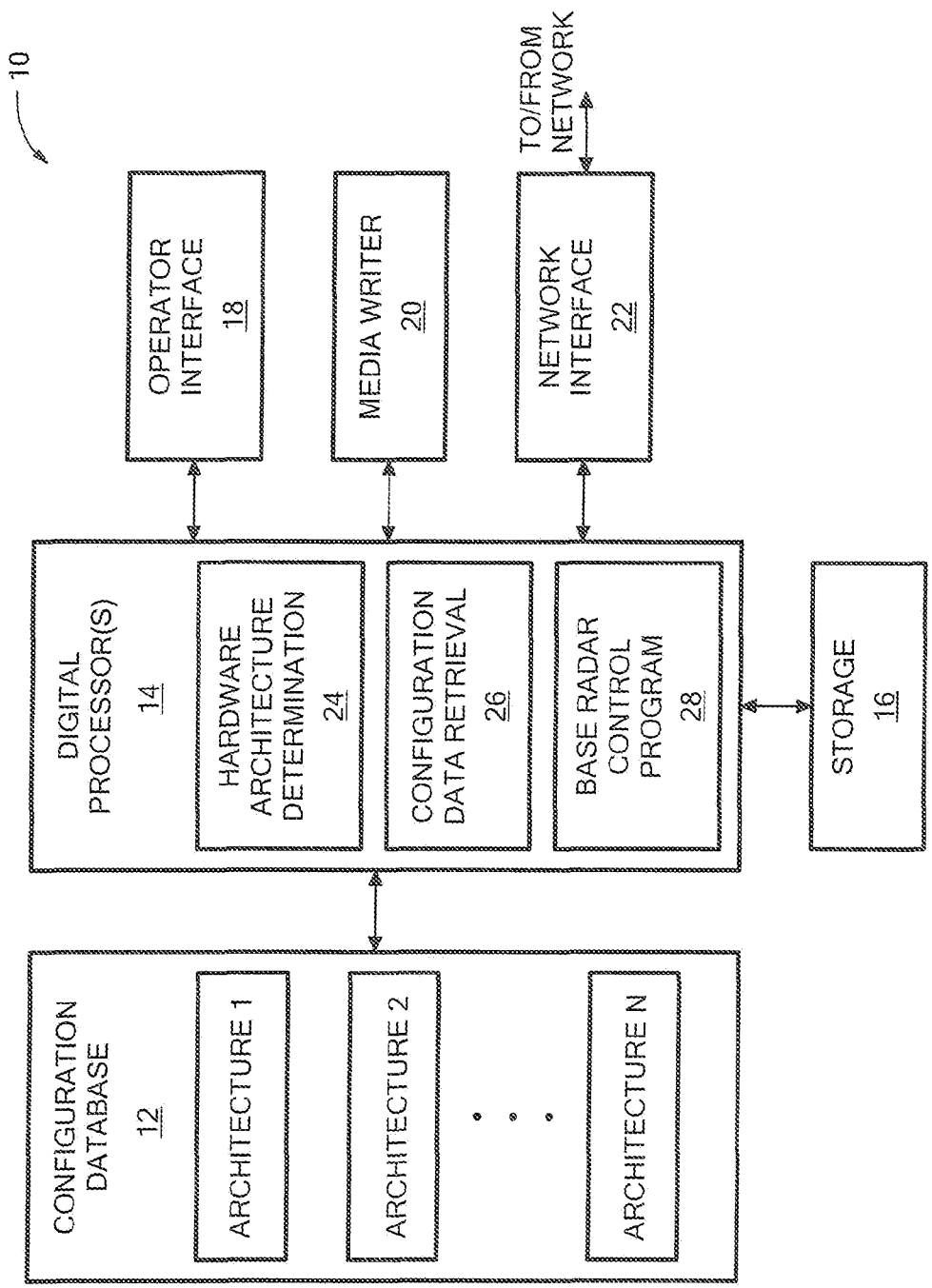
FIG. 1 is a block diagram illustrating an exemplary system for use in generating radar control software for radar systems having different hardware architectures in accordance with an embodiment.

Radar systems are typically implemented with a hardware architecture that is intended to carry out the intended functions of the radar. For this reason, different types of radar will often have different hardware architectures. For example, a weather radar for use in tracking weather patterns near an airport may have a very different hardware configuration than a fire control radar that tracks targets for the purpose of directing weapons at the targets. Hardware differences between radar systems may include, for example, differences in antenna type, differences in radio frequency (RF) components (e.g., RF transmitter, RF receiver, exciter, etc.), differences in signal processing components, differences in beam steering components, differences in user interface components, differences in the operational frequency range of components, differences in computational complexity and/or speed of components, differences implementing platform, and so on. Radar systems typically include digital control circuitry (e.g., a digital processor, etc.) to control the operation of corresponding hardware elements during radar operation. Radar control software may be provided for use in programming the digital control circuitry to perform the control function.

Radar systems having different hardware architectures have traditionally used different, specially developed radar control software programs to perform radar control functions. Thus, a radar system manufacturer that provides different types of radar systems would have to maintain a number of different software programs to support the different types of radar sold. As will be appreciated, the process of maintaining a number of different programs can be expensive, labor intensive, and time consuming. For example, using this approach, code changes made to one program will usually have to be made to all of the other programs, which can take considerable time and effort and may lead to errors. In addition, separate inventory might have to be maintained by a manufacturer fix each of the different programs and efforts would need to be made to ensure that customers received the appropriate software for the type of system purchased.

In conceiving the concepts, systems, and techniques described herein, it was appreciated that, despite differences in hardware, the basic operating principles of most radar systems are essentially the same. Thus, in some embodiments described herein, techniques are provided that allow the same base software program to be used by radar systems having a wide variety of different hardware configurations. That is, a single software control program may be provided that implements the basic operating principles and functions required of all radar systems. The operating details associated with different hardware architectures may then be maintained within a separate configuration database. Thus, if a weather radar having a specific hardware configuration is purchased by a customer, a control software program may be generated or configured for the customer by configuring the base program using appropriate configuration data from the configuration database. If software changes need to be made, then only the single base software program needs to be modified. If a new hardware architecture needs to be supported, then only configuration data needs to be generated for the new architecture and not an entire new program.

As used herein, the term "configuration database" is used in the broad sense to include any collection of stored data that may be used to configure radar control software based on, for example, hardware configuration. The term is not meant to be limited to any particular database standard or database management system. As used herein, the phrases "hardware configuration" and "hardware architecture" are used to indicate the type, size, or number of hardware components used in a radar system; the interconnection of the components; and the operating parameters, performance level, and functions of the components (such as, for example, the operating frequency band of a component, etc.). Thus, a radar that includes an array antenna operative at X-band may be considered to have a different hardware architecture then a radar that includes a similar array antenna operative at C-band. As another example, a radar that includes an antenna operative at X-band with a single channel beamforming design may be considered to have a different hardware architecture than a radar that includes a similar antenna with a multi-channel or sub-array design. Similarly, an X-band radar with a 4 meter antenna aperture would be considered to have a different architecture than an X-band radar with a 1 meter antenna aperture.

Some examples of differences that may exist between hardware architectures in different radar systems may include, for example, (1) a fixed antenna versus a rotating antenna; (2) a single rotating antenna to achieve 360 degree coverage in azimuth versus three stationary array faces to achieve the same coverage; (3) X-band operation versus C-band operation; (4) a large aperture array versus a small aperture array; (5) single feed beamforming versus subarray, modular, or elemental beamforming; (6) a single transmitter configuration versus a distributed transmitter configuration; and (7) a stationary platform versus a mobile platform. Many other ways of distinguishing between hardware architectures may also be defined. As will be appreciated, different architectures may differ from one another in various different ways.

Some of the advantages of the described approach for providing radar control software include, for example, avoidance of costs associated with the maintenance of multiple software products; reduction in the likelihood of introducing errors associated maintaining multiple software baselines; reduction in software and system quality and performance verification times since common software functions require less verification; improvements and fixes for software associated with one radar being readily shared with other radars/applications; the ability to quickly apply knowledge and expertise associated with one radar to support other radars; the ability to re-use software products for other radars, and/or others.

FIG. 1 is a block diagram illustrating an exemplary system 10 for use in generating radar control software for radar systems having different hardware architectures in accordance with an embodiment. As shown, the system 10 may include: a configuration database 12, one or more digital processors 14, digital storage 16, an operator interface 18, a media writer 20, and a network interface 22. The configuration database 12 stores configuration data associated with a number of different radar hardware architectures. The digital processor(s) 14 is operative for, among other things, configuring a base radar control program using configuration data from the database 12. The digital storage 16 stores programs and/or data for use by the processor(s) 14 in a non-volatile form. Among other things, the digital storage 16 may store a copy of the base radar control program. The operator interface 18 provides an interface between the system 10 and one or more system operators. The media writer 20 is operative for writing programs or data generated or configured by the digital processor(s) 14 to non-transitory computer readable media (e.g., compact disc read only memories (CD-ROMs) digital video discs (DVDs), BluRay disks, flash memories, etc.) for distribution. The network interface 22 is operative for providing an interface between the system 10 and an external network (e.g., the Internet, etc.). It should be appreciated that the system 10 of FIG. 1 is an example of one type of system that may be used in an embodiment to implement concepts, features, and techniques described herein.

As described above, the configuration database 12 is operative for storing configuration data for use in configuring a base radar control program. The database 12 may include configuration data for a plurality of different radar system architectures (e.g., configuration data for each type of hardware architecture provided by a particular radar system manufacturer, etc.). For each different architecture, the configuration database 12 may include a single configuration file or a collection of files that may be used to configure the control software. The configuration database 12 may also include data that associates each file or collection of files with the corresponding radar architecture. The configuration database 12 may be stored in any type of non-volatile digital data storage device, structure, or system. This may include, for example, hard disks, optical disks, compact disc read only memories (CD-ROMs), magneto-optical disks, read only memories (ROMs), erasable programmable ROMs (EPROMs), electrically erasable programmable ROMs (EEPROMs), magnetic or optical cards, flash memory, and/or other types of non-volatile storage media.

The digital processor(s) 14 are operative for configuring a base radar control program using configuration data from the configuration database 12. The base radar control program is a program that includes code for performing basic operations, tasks, and functions required by most radar systems. The hardware-specific details of these different operations, tasks, and functions have been removed from the base program. As shown in FIG. 1, during system operation, the processor(s) 14 may load various programs and/or adaptation data into random access memory (RAM) from digital storage 16. That is, the processor(s) 14 may load hardware architecture determination code 24, configuration data retrieval code 26, and the base radar control program 28. The processor(s) 14 may then use these programs to generate or configure a radar control program for use with a particular hardware configuration. The hardware architecture determination code 24 determines a hardware architecture of interest. The hardware architecture determination code 24 may receive an indication of the hardware architecture of interest from, for example, a system operator via operator interface 18. In some other implementations, the hardware architecture determination program 24 may receive an indication of the hardware architecture from an end user via network interface 22. In some other implementations, the hardware architecture determination program 24 may perform an automatic process to determine what hardware architecture is in use based upon interfaces, performance levels, configuration code fields or messages, pre-stored data, or other information accessible to the software. Other techniques for determining the hardware architecture of interest may alternatively be used.

After the hardware architecture of interest has been determined, the configuration data retrieval code 26 may retrieve configuration data associated with the identified hardware architecture from the database 12. Techniques for retrieving data of a particular type from a database are well known in the art. After the configuration data has been retrieved, the data may be used to configure the base radar control program 28 to operate with the identified hardware architecture. This configuration process may involve, for example, adding or modifying one or more data items or values to appropriate locations in the base program, activating or deactivating one or more functions, subroutines, modes, or modules of the base program; selecting the appropriate control parameters for a mode or function; performing hardware integrity, fault, and diagnostic tests; and activating or deactivating certain interfaces.

After the base program has been configured using the retrieved configuration data, the configured program and/or data may be delivered to the media writer 20 to be transferred to digital media. The digital media may then be loaded into the processor(s) for immediate use or delivered to an end user for use with a corresponding radar system or stored for future delivery. Alternatively, or in addition, the configured program may be delivered to an end user across a network using network interface 22. In another possible alternative, the configured program may be stored in digital storage 16 for delivery to an end user at a future time. The above-describe technique may be used repeatedly to generate or configure radar control software for radar systems having a variety of different hardware configurations that may be static or may change dynamically.

If changes are needed to the radar control software, the changes only need to be made to the base radar control program, rather than a variety of different programs. For example, if an improved technique for calculating a particular parameter is found, only the base program needs to be modified to implement the improved technique. The modified base program may then be stored to digital storage 16 for use in generating or configuring radar control programs for radar systems having all different types of supported hardware architectures.

In some implementations, the system 10 may be configured to generate or configure radar control programs and/or data for each different hardware architecture supported and store the programs and/or data within digital storage 16 (or some other non-volatile storage). The programs and/or data are then be more readily available when needed. Thus, if an operator requests a disk with a control program for a particular hardware architecture, the processor(s) 14 need only retrieve the program and/or data from storage 16 and deliver it to the media writer 20. If the base control program is modified at some point, the processor(s) 14 may then generate new configured programs and/or data for the different hardware architectures using the modified base program and store them in storage 16. As described previously, if new hardware architectures are to be supported by system 10, new configuration data needs to be added to the database 12 for the new architecture. Any number of different architectures may be supported in this manner.

In some implementations, the system 10 may be configured to selectively retrieve and apply the previously stored radar control programs and/or data for each different hardware architecture supported and control the radar system as appropriate for that hardware configuration to perform the intended mission.

In some implementations, a web interface may be provided that allows end users to directly retrieve radar control programs from system 10 for use with a corresponding radar system. The web interface may operate through, for example, network interface 22. The web interface may also permit end users to retrieve updated versions of the software when available.

The digital processor(s) 14 may include any type of digital processing device that is capable of configuring a base radar control program using architecture-specific configuration data. This may include, for example, a general purpose microprocessor, a digital signal processor (DSP), a reduced instruction set computer (RISC), a complex instruction set computer (CISC), an application specific integrated circuit (ASIC), a microcontroller, a Field Programmable Gate Array (FPGA), a Graphic Processor Unit (GPU), an embedded controller, a multi-core processor, a processor complex, and/or others, including combinations of the above. In various embodiments, techniques and systems described herein may be implemented using any combination of hardware, software, and firmware.

Figure 2:
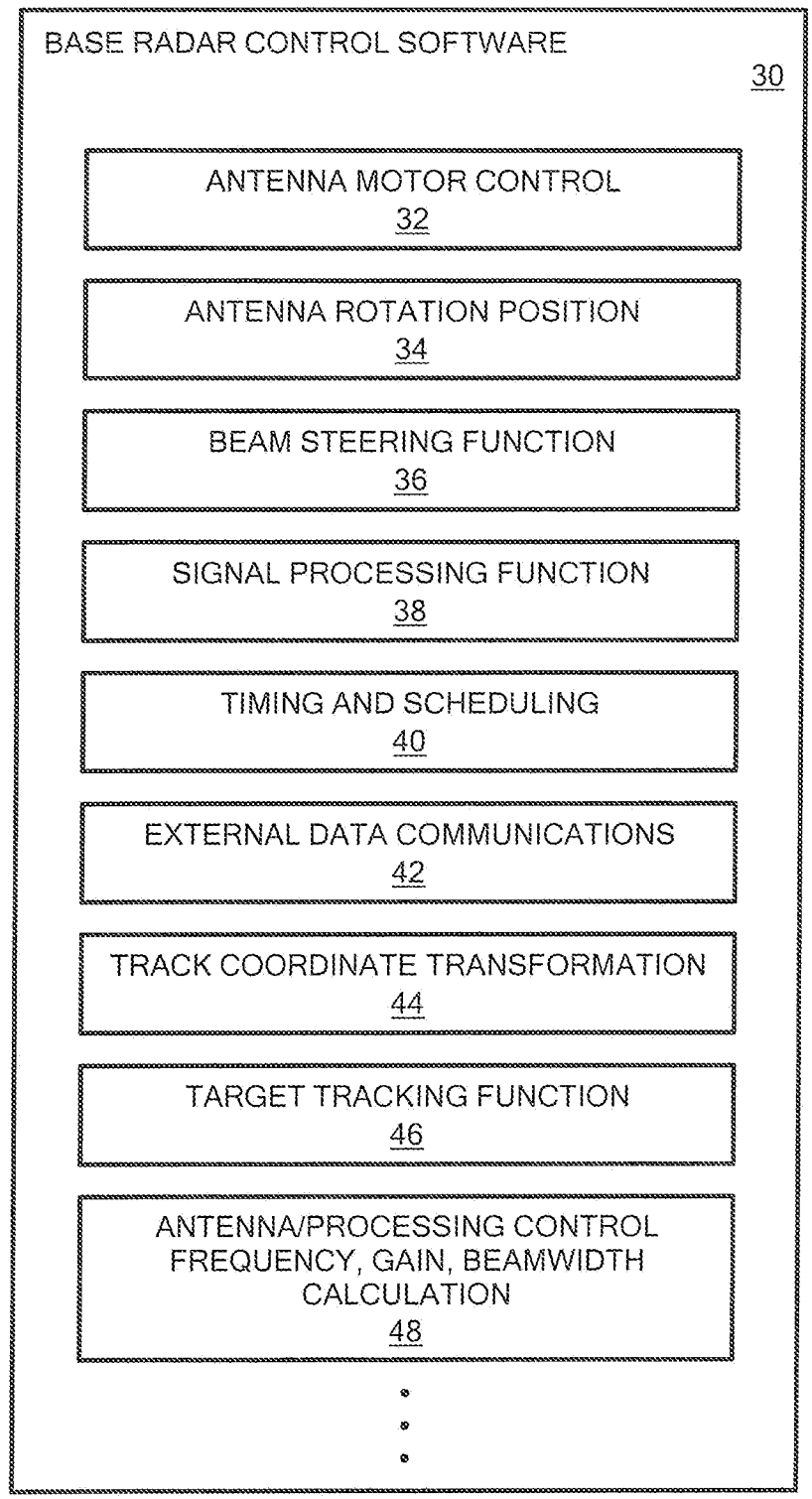
FIG. 2 is a diagram illustrating exemplary radar functions that may be included in a base radar control software program in accordance with an embodiment.

The base radar control software 28 of FIG. 1 may include code for performing any number of different radar functions. FIG. 2 is a diagram illustrating exemplary radar functions that may be included in a base radar control software program 30 in an embodiment. As shown, the software 30 may include: an antenna control module 32, an antenna rotation position module 34, a beam steering module 36, a signal processing module 38, a timing and scheduling module 30, an external data communications module 32, a track coordinate transformation module 34, a target tracking module 36, and an antenna/processing control module 38. Any one or more of these different modules/functions may be configurable using configuration information from the configuration database 12. Other modules/functions may be provided within radar control software in other embodiments.

Figure 3:
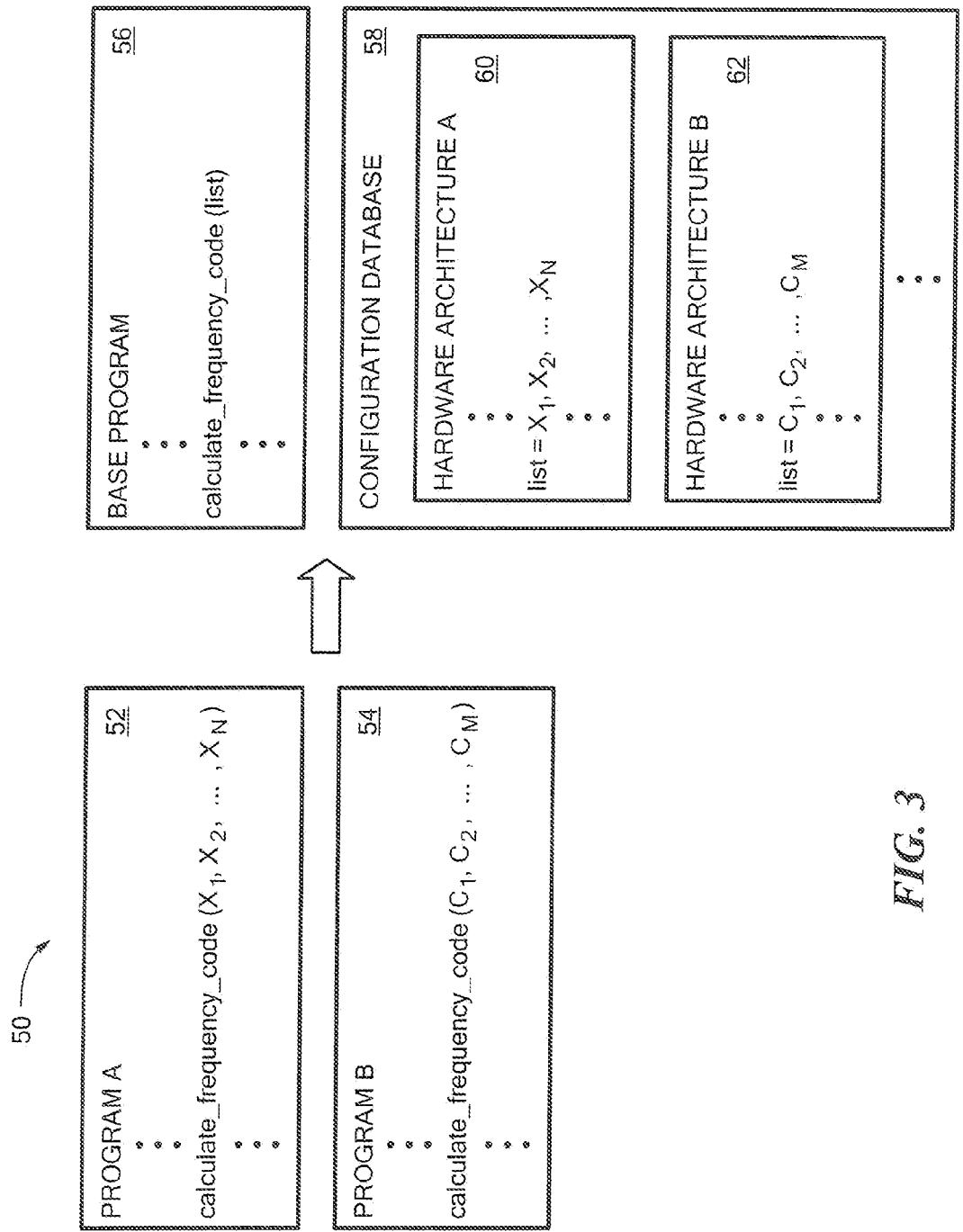
FIG. 3 is a diagram illustrating an exemplary technique for use in generating a base radar control program in accordance with an embodiment.

FIG. 3 is a diagram illustrating an exemplary technique 50 for use in generating or configuring a base radar control program in accordance with an embodiment. As shown, in a conventional approach, a first radar control program 52 (Program A) might be provided for first radar system having a first hardware architecture and a second radar control program 54 (Program 13) might be provided for a second radar system having a second, different hardware architecture. The first radar system may be an X-band radar and the second radar system may be a C-band radar. Each of the programs 52, 54 may include a function "calculate_frequency_code" that determines the frequency of a next transmit beam. The function may be similar within the two programs, except the function in the first program 52 may use a list of X-band frequencies (i.e., $X_1, X_2, \ldots, X_N$) and the function in the second program 54 may use a list of C-band frequencies (i.e., $C_1, C_2, \ldots, C_M$). As an alternative to this conventional approach, a base program 56 may be provided that includes the "calculate_frequency_code" function for a generic list of frequencies (i.e., list). A configuration database 58 could then be provided that includes first configuration data 60 for the first hardware architecture and second configuration data 62 for the second hardware architecture. The first configuration data 60 can include the list of the X-band frequencies (i.e., $X_1, X_2, \ldots, X_N$) and the second configuration data 62 can include the list of C-band frequencies (i.e., $C_1, C_2, \ldots, C_M$). The first and second configuration data 60 may also include other parameters associated with the corresponding hardware architectures.

In another example, some different hardware architectures may use different antenna configurations (e.g., different types of antennas, different array sizes, different inter-element spacing, etc.). These hardware architectures can use identical software code, but use different adaptation data for the different architectures. The different adaptation information may include, for example, different beamwidth data (typically used by functions that correlate detections with current tracks), different beam splitting coefficients (typically used by functions that accurately determines the angular position of the target), and different peak transmit power/antenna transmit and receive gain data (typically used by functions that calculate target size or radar cross section).

Figure 4:
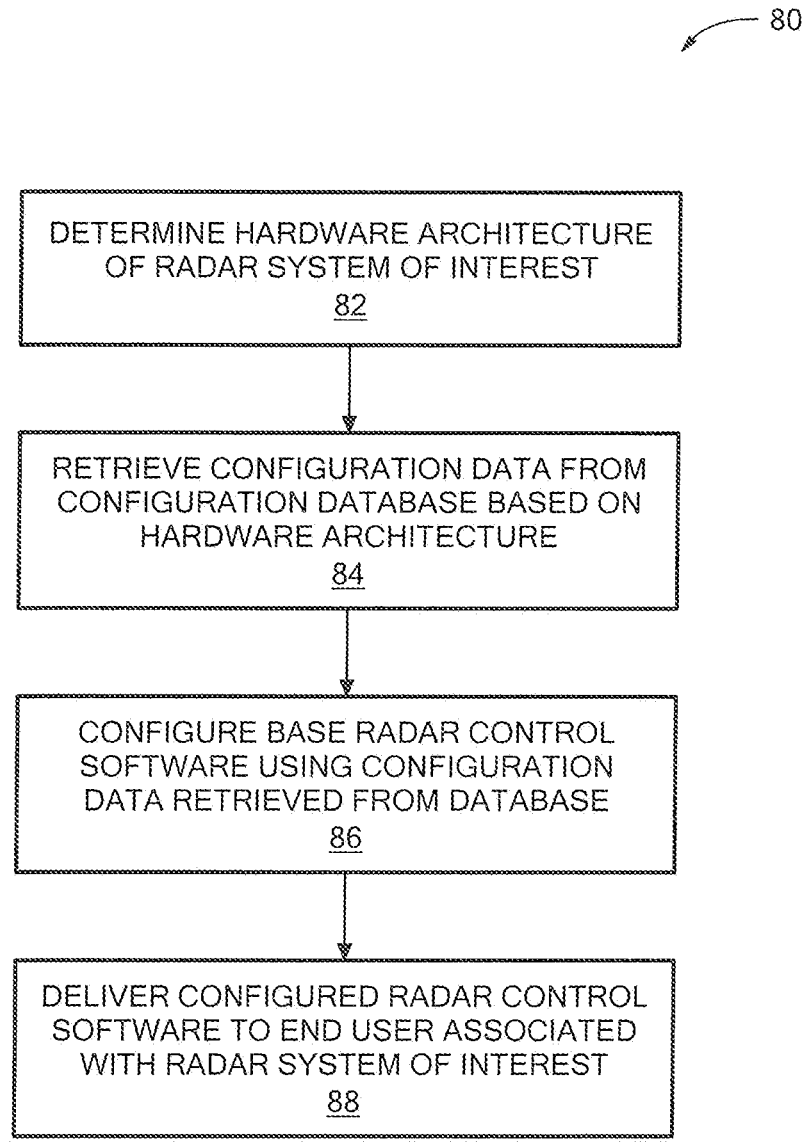
FIG. 4 is a flow diagram illustrating a process for generating or configuring radar control software in accordance with an embodiment.

FIG. 4 is a flow diagram showing as process for generating or configuring radar control software in accordance with an embodiment.

The rectangular elements (typified by element 82 in FIG. 4) are herein denoted "processing blocks" and may represent computer software instructions or groups of instructions. It should be noted that the flow diagram of FIG. 4 represents one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables may not be shown. It will be appreciated by those of ordinary skill in the art that unless otherwise indicated herein, the particular sequence described, is illustrative only and can be varied without departing from the spirit of the concepts described and/or claimed herein. Thus, unless otherwise stated, the processes described below are unordered meaning that, when possible, the sequences shown in FIG. 4 can be performed in any convenient or desirable order.

Referring now to FIG. 4, a hardware architecture associated with as radar system of interest may first be determined (block 82). Once the hardware architecture has been identified, configuration data corresponding to the hardware architecture is retrieved from a configuration database (block 84). The configuration data may be included within a configuration file or folder of the configuration database that is associated with the corresponding hardware architecture. Alternatively, a computer program may detect hardware configurations automatically based upon the available interfaces, digital identification codes, digital or analog performance characteristics, or other parameters accessible to the digital processor(s). A base radar control program may then be configured using the retrieved configuration data (block 86). This may involve, for example, adding appropriate values to the control software; activating or deactivating specific modules or subroutines of the control software; applying the specific data values appropriate for the hardware; and/or performing any other tasks necessary to customize the base program to the hardware configuration of the radar system if interest. After the base radar control program has been configured, the software may be immediately executed on the radar or alternatively may be stored and delivered to an end user associated with the radar mission of interest (block 88). This process can be continually repeated to generate or configure software for radar systems having a wide variety of different hardware architectures.

In some embodiments, the radar control software and/or data provided to an end user will not be further configurable. That is, the software and/or data will be fully configured using the data retrieved from the database before it is delivered to the end user. In other embodiments, some degree of configurability may remain in the software product that is delivered to the end user. For example, in some embodiments, the delivered software and/or data may be configurable for different types of radar missions that may be performed by the radar system of the end user. In these embodiments, the radar system of the end user may have its own configuration database that has configuration data associated with different radar missions that can be carried out by the system. Before a mission is performed within the radar system, configuration data associated with a particular mission type to be performed may be retrieved from the database and used to farther configure the control software. After the software has been configured, the radar mission may be carried out.

In the description above, various techniques have been described in the context of generating and configuring software products for use with radar systems having different hardware architectures. It should be appreciated, however, that some of the described features may also have application within a single radar system that has a variable or adaptable architecture. Some radar systems may be able to change various elements of an underling hardware architecture or configuration on the fly (e.g., using different subsets of a large antenna array at different times, etc.). In these systems, the techniques described above could be used to modify radar control software executing within the system to account for the varying system architecture. This could be done instead of changing the software program being used within the radar system every time a hardware modification is made.

As used herein, the phrase "configured to," when used in connection with a processor or computer, is intended to cover any processor or computer that is specially adapted to perform the corresponding task or function. This may include, for example, a reconfigurable hardware device (e.g., an FPGA, a PLA, etc.) that is configured with or has access to configuration information to perform the task or function. It may also include, for example, a programmed or programmable processor or processors that have associated software available to perform the task or function. As such, a reconfigurable or programmable unit is considered "configured to" perform a particular task or function if it has access to a memory or storage device having information or software stored therein that is capable of carrying out the task or function when loaded into the respective reconfigurable or programmable unit.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for generating radar control software for a radar system, comprising:
    determining a hardware architecture associated with a radar system of interest;
    retrieving configuration data from a configuration database that is associated with the hardware architecture; and
    using the retrieved configuration data to configure a base radar control software program to configure or operate a radar control program for the radar system of interest by using the configuration data to adapt one or more radar functions in the radar control software to the identified radar architecture,
    wherein the radar function comprise: antenna control, beam steering, timing and scheduling, user control and display, coordinate transformation and stabilization, and target tracking, and
    wherein at least one of the radar functions is configurable using configuration data from the database.

2. The method of claim 1, further comprising:
    repeating determining, retrieving, and using to configure the base radar control software program for radars having a variety of different hardware architectures.

3. The method of claim 1, wherein:
    determining a hardware architecture associated with a radar system of interest includes receiving a hardware architecture indication as input from an operator.

4. The method of claim 1, further comprising:
delivering the configured radar control software program to an end user associated with the radar system of interest.

5. The method of claim 1, further comprising:
storing the configured radar control software program on a non-transitory computer readable medium or media.

6. The method of claim 1, further comprising:
transmitting the configured radar control software program to an end user associated with the radar system of interest via a network.

7. A system for generating or configuring radar control software for radar systems having a variety of different hardware architectures, the system comprising:
a database storing configuration data for use in configuring a configurable base radar control software program, the database having different configuration files that are associated with different radar system architectures; and
one or more digital processors configured to:
   determine a hardware architecture associated with a radar system of interest;
   retrieve configuration data from a configuration database that is associated with the identified hardware architecture; and
   configure the configurable base radar control software program to work with the radar system of interest using the retrieved configuration data,
wherein the base radar control software program includes a plurality of modules or functions for controlling operation of a radar system, the plurality of modules or functions comprising antenna control, beam steering, timing and scheduling, user control and display, coordinate transformation and stabilization, and target tracking, and
wherein at least one of the modules or functions associated with the base radar control software program is configurable using configuration data from the database.

8. The system of claim 7, further comprising:
a digital media writer coupled to the one or more digital processors to write the configured radar control software program to a non-transitory computer readable storage medium or media.

9. The system of claim 7, wherein:
the database includes one or more configuration files for each radar system architecture supported.

10. The system of claim 7, wherein:
the database includes one or more configuration files that are associated with all types of radar system architecture supported.

11. The system of claim 7, wherein:
the database includes first configuration data associated with a first radar architecture that includes a rotatable antenna and second configuration data associated with a second radar architecture that includes a stationary antenna.

12. The system of claim 7, wherein:
the database includes first configuration data associated with a first radar architecture that includes an antenna array and second configuration data associated with a second radar architecture that includes a parabolic dish antenna.

13. The system of claim 7, wherein:
the database includes first configuration data associated with a first radar architecture that includes an electronically steerable array and second configuration data associated with a second radar architecture that includes a mechanically steerable antenna.

14. The system of claim 7, wherein:
the database includes first configuration data associated with a first radar architecture that includes a full-array antenna beamforming/feed architecture and second configuration data associated with a second radar architecture that includes a sub-array antenna beamforming/feed architecture.

15. The system of claim 7, wherein:
the database includes first configuration data associated with a first radar architecture that includes a radio frequency (RF) transmitter operative within a first frequency band and second configuration data associated with a second radar architecture that includes an RF transmitter that is operative within a second frequency hand that is different from and non-overlapping with the first frequency band.

16. The system of claim 7, wherein:
the database includes first configuration data associated with a first radar architecture situated on a stationary platform and second configuration data associated with a second radar architecture situated on a mobile platform.

17. The system of claim 7, further comprising:
a network interface coupled to the one or more digital processors to transmit the configured radar control software program to an end user associated with the radar system of interest via a network.

18. An apparatus comprising a non-transitory computer readable medium or media having the following stored thereon:
a configurable radar control software program to control operation of an associated radar system when executed by a computer of the radar system, the configurable radar control software program having a plurality of modules or functions for performing basic radar tasks, wherein one or more of the plurality of modules or functions are configurable using configuration data; and
computer instructions that, when executed by a processing system, operate to: determine a radar system architecture associated with a radar system of interest, retrieve configuration data from a database based on the identified radar system architecture, and adapt at least one of the plurality of modules or functions of the configurable radar control software using the retrieved configuration data,
wherein the configurable radar control software program includes a plurality of modules or functions for controlling operation of a radar system, the plurality of modules or functions comprising antenna control, beam steering, timing and scheduling, user control and display, coordinate transformation and stabilization, and target tracking, and
wherein at least one of the modules or functions associated with the base radar control software program is configurable using configuration data from the database.

* * * * *

UNITED STATES PATENT AND TRADEMARK OFFICE
CERTIFICATE OF CORRECTION

| | | |
|---|---|---|
| PATENT NO. | : 9,489,195 B2 | Page 1 of 1 |
| APPLICATION NO. | : 14/103157 | |
| DATED | : November 8, 2016 | |
| INVENTOR(S) | : Alan B. Moore et al. | |

It is certified that error appears in the above-identified patent and that said Letters Patent is hereby corrected as shown below:

On the Title Page

Item [73], delete "Raytheon Company" and replace with -- Raytheon Command and Control Solutions LLC --.

Signed and Sealed this
First Day of August, 2017

Joseph Matal
*Performing the Functions and Duties of the*
*Under Secretary of Commerce for Intellectual Property and*
*Director of the United States Patent and Trademark Office*